United States Patent
Hara et al.

(10) Patent No.: US 6,399,241 B1
(45) Date of Patent: Jun. 4, 2002

(54) NONAQUEOUS ELECTROLYTE BATTERY

(75) Inventors: Tomitaro Hara; Tsuyonobu Hatazawa; Kazuhito Hatsuta, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/421,936

(22) Filed: Oct. 21, 1999

(30) Foreign Application Priority Data

Oct. 23, 1998 (JP) ............................................ 10-303084

(51) Int. Cl.$^7$ ................................................ H01M 2/00
(52) U.S. Cl. ........................ 429/163; 429/162; 429/171; 429/124; 429/127; 429/131; 429/132
(58) Field of Search ................................ 429/163, 162, 429/171, 124, 127, 131, 132

(56) References Cited

U.S. PATENT DOCUMENTS

| | | | |
|---|---|---|---|
| 5,800,939 A | * | 9/1998 | Mishina et al. ................ 429/57 |
| 6,080,508 A | * | 6/2000 | Dasgupta et al. ............ 429/127 |
| 6,231,626 B1 | * | 5/2001 | Yoshida et al. ............. 29/623.5 |
| 6,245,456 B1 | * | 6/2001 | Fukuda et al. ............... 429/122 |

FOREIGN PATENT DOCUMENTS

| | | |
|---|---|---|
| EP | 0 390 557 A2 | 10/1990 |
| EP | 0 397 248 A2 | 11/1990 |
| EP | 0 852 404 A1 | 7/1998 |
| EP | 0 862 227 A1 | 9/1998 |

* cited by examiner

Primary Examiner—Gabrielle Brouillette
Assistant Examiner—Angela J Martin
(74) Attorney, Agent, or Firm—Bell, Boyd & Lloyd LLC

(57) ABSTRACT

It is an object to quickly disperse heat generated when short circuit occurs between a positive electrode and a negative electrode. A nonaqueous-electrolyte battery is disclosed which incorporates: an encapsulating medium constituted by a laminated film in which a unit cell is accommodated, wherein the laminated film of the encapsulating medium contains a metal material having a heat conductivity k at room temperatures which is 230 Wm$^{-1}$K$^{-1}$ or higher. Moreover, ratio R of the volume of the metal material portion of the encapsulating medium with respect to a capacity of 1 mAh of the unit cell is 0.0002 cm$^3$/mAh≦R≦0.003 cm$^3$/mAh.

15 Claims, 3 Drawing Sheets

NONAQUEOUS ELECTROLYTE BATTERY

RELATED APPLICATION DATA

The present application claims priority to Japanese Application No. P10-303084 filed Oct. 23, 1998 which application is incorporated herein by reference to the extent permitted by law.

BACKGROUND OF THE INVENTION

1. Field of the Invention

The present invention relates to a nonaqueous-electrolyte battery incorporating an encapsulating medium constituted by a laminate film and arranged to encapsulate a unit cell.

2. Description of the Related Art

In recent years, electronic apparatuses represented by portable telephones and notebook personal computers have been formed into cordless structures and their sizes have been reduced. Therefore, a variety of portable electronic apparatuses have sequentially been researched and developed, the thicknesses, sizes and weights of which have been reduced. Since the apparatuses have been varied, the quantities of electric power which is consumed by the apparatuses have been enlarged. Therefore, there arises a need for enlarging the capacities of batteries which are energy sources for the foregoing electronic apparatuses, and more particularly enlarging the capacities of secondary batteries.

The conventional secondary batteries are represented by lead batteries and nickel-cadmium batteries. Moreover, new secondary batteries have been put into practical use, the secondary batteries including nickel-hydrogen batteries and lithium-ion batteries. The foregoing secondary batteries arranged to use liquid to serve as an electrolyte, however, suffer from a problem in that liquid leaks.

To overcome the above-mentioned problem, a polymer lithium-ion secondary battery has been developed which uses polymer gels swelled by the electrolytic solution as the electrolyte. Since the polymer lithium-ion secondary battery has been developed, the fear of leakage of the solution from the battery can be eliminated. As a result, a secondary battery exhibiting a small size, light weight and a small thickness and having a high energy density can be realized.

The structure of the polymer lithium-ion secondary battery will now be described. Active materials, made of, for example, $LiCoO_2$ and graphite, are laminated on a positive electrode collector, while active materials made of carbon, cokes and graphite are laminated on a negative electrode constituted by a thin copper plate. Thus, electrodes are formed. Moreover, a separator is sandwiched between the electrodes, the separator being a thin film made of polypropylene, polyethylene or the like and having pores. In addition, a space between the electrode and the separator is filled with polymer gels made of polyacrylonitrile (PAN), polyethylene oxide (PEO) or polyvinylidene fluoride (PVDF). Thus, a sandwich structure is employed.

Each unit cell having the sandwich structure is packaged in an encapsulating medium serving as an encapsulating container constituted by a thin metal film, such as aluminum foil and a plastic film made of nylon, polyethylene, polypropylene or polyethylene terephthalate.

In general, a battery of the foregoing type is mounted in a small space formed in the electronic apparatus in which elements are densely integrated. Therefore, it is preferable that a sheathing material is employed which has satisfactory flexibility against a variety of stresses. The inventors of the present invention have developed a method of manufacturing a card-type battery which is capable of maintaining characteristics required for the battery and which incorporates a flexible encapsulate medium in which the unit cell is encapsulated (refer to Japanese Patent Laid-Open No. 8-83596).

A lithium secondary battery of the foregoing type has characteristics that the battery produces a large output and exhibits a high energy density. Therefore, if short circuit occurs between the positive electrode and the negative electrode owing to a problem of a charging unit or the peripheral circuit of the battery or an incorrect operation of the battery performed by a user, a large electric current flows in the battery. As a result, there is apprehension that rapid heat generation and rise in the internal pressure occur and the battery is broken. If heat is generated in the unit cell owing to the short circuit, there is apprehension that a serious accident occurs. As a safety mechanism capable of preventing the serious accident, a current limiter (for example, a PTC circuit or a fuse) is provided for the body of the battery or the peripheral circuit of the battery, the current limiter being able to limit an instantaneous output current.

The conventional safety mechanism, however, has a possibility that generated heat is accumulated in the battery even after the electric current has been limited. Therefore, development of a new safety mechanism has been required which is capable of preventing generation of heat in addition to the conventional current limiter.

SUMMARY OF THE INVENTION

To overcome the foregoing problems experienced with the conventional techniques, an object of the present invention is to quickly disperse heat which is generated when short circuit occurs between a positive electrode and a negative electrode to prevent accumulation of latent heat in the battery.

To achieve the foregoing object, according to one aspect of the present invention, there is provided a nonaqueous-electrolyte battery comprising an encapsulating medium constituted by a laminated film in which a unit cell is accommodated, wherein the laminated film of the encapsulating medium contains a metal material having a heat conductivity k at room temperatures which is 230 $Wm^{-1}K^{-1}$ or higher.

Moreover, the ratio R of the volume of the metal material portion of the encapsulating medium with respect to a capacity of 1 mAh of the unit cell is 0.0002 $cm^3/mAh \leq R \leq 0.05$ $cm^3/mAh$.

Since a metal material having high heat conductivity is employed to constitute the encapsulating medium, dispersion of heat from the unit cell can be accelerated.

When the volume of the metal material portion is made to be a proper value, a sufficient heat radiation effect can be obtained while a high energy density is being maintained.

Other objects, features and advantages of the invention will be evident from the following detailed description of the preferred embodiments described in conjunction with the attached drawings.

DESCRIPTION OF THE PREFERRED EMBODIMENTS

The structure of a nonaqueous-electrolyte battery according to the present invention will now be described with reference to the drawings.

Figure 1:
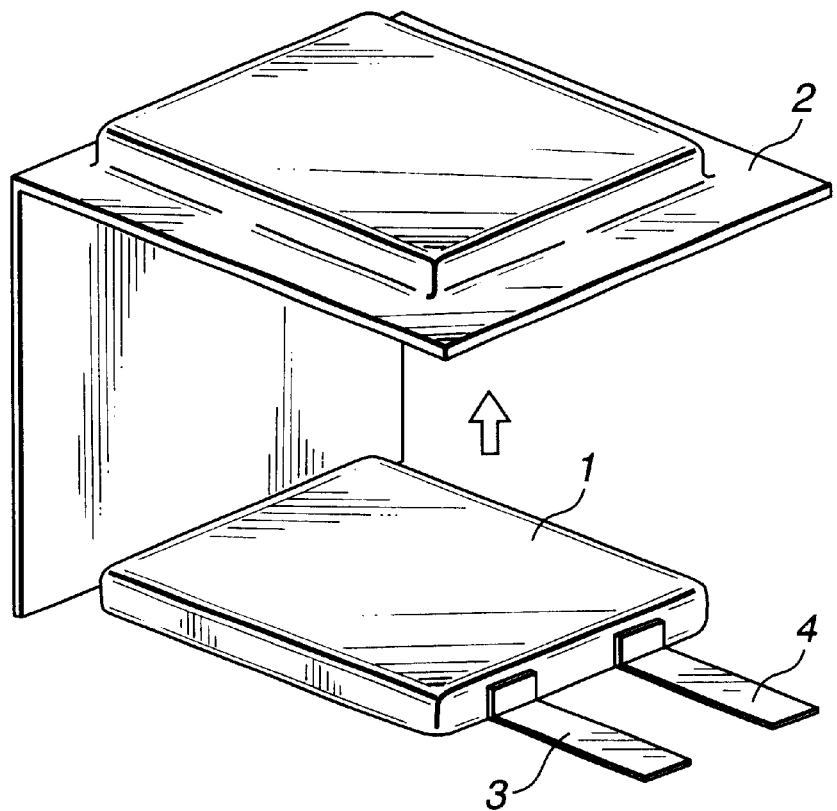
FIG. 1 is an exploded perspective view showing an example of the structure of a solid electrolyte battery to which the present invention is applied.
Figure 2:
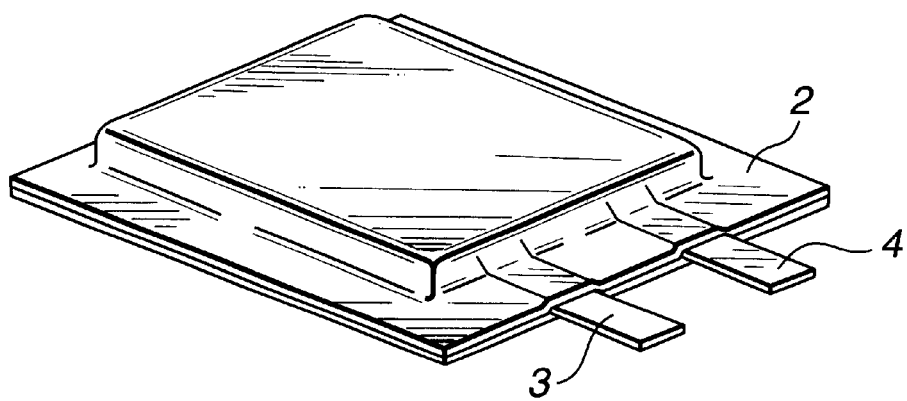
FIG. 2 is a schematic perspective view showing an example of the structure of a solid electrolyte battery to which the present invention is applied.

The nonaqueous-electrolyte battery according to the present invention is, for example, a solid electrolyte battery or a gel-type electrolyte battery. As shown in FIGS. 1 and 2, a unit cell 1, in which a solid electrolyte or a gel electrolyte is disposed between a positive-electrode active material layer and a negative-electrode active material layer, is accommodated in an encapsulating medium 2 constituted by a laminated film. Then, the outer portion is welded with heat so that a sealed structure is realized.

The unit cell 1 is provided with a negative-electrode-terminal lead 3, which is electrically connected to a negative electrode which constitutes the unit cell 1, and a positive-electrode-terminal lead 4 which is electrically connected to the positive electrode. The negative-electrode-terminal lead 3 and the positive-electrode-terminal lead 4 are drawn out to the outside of the encapsulating medium 2.

Figure 3:
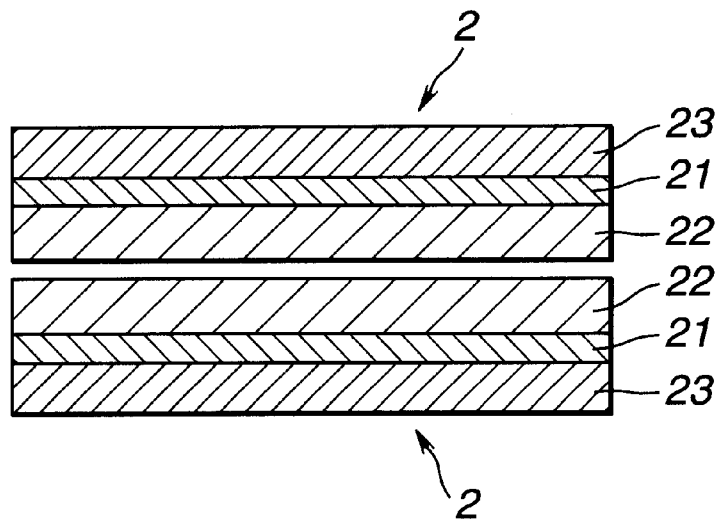
FIG. 3 is a cross sectional view showing an example of a sheathing material.

The encapsulating medium 2 according to the present invention has a structure, for example, as shown in FIG. 3 that plastic films 22 and 23 are bonded to a thin metal film 21. The plastic films 22 and 23 are arranged to weld and seal the structure with heat when the unit cell 1 is encapsulated, the plastic films 22 and 23 being made of polyethylene, polypropylene, polyethylene terephthalate or the like. If the plastic films 22 and 23 are made of a thermoplastic material, the raw material is not limited. The plastic film may be bonded to only either side of the thin metal film or each of the two surfaces of the thin metal film.

The present invention is characterized by the thin metal film 21 which is a component of the encapsulating medium 2. It is preferable that the thin metal film 21 is made of a metal material which is capable of quickly radiating and dispersing heat generated owing to short circuit occurring in the unit cell 1. That is, it is preferable that a metal material having a heat conductivity is employed. The heat conductivity k is indicated with a heating value which flows through a surface having an area of 1 m$^2$ of a plate having a thickness of 1 m when the temperatures of the two surfaces of the plate are different from each other by 1 k. The unit of the heat conductivity k is Wm$^{-1}$K$^{-1}$.

It is preferable that the heat conductivity k of the thin metal film 21 which constitutes the encapsulating medium 2 is 230 Wm$^{-1}$K$^{-1}$ or greater. If the heat conductivity k is smaller than the above-mentioned value, there is a possibility that heat is accumulated in the battery. The material is exemplified by aluminum, copper and titanium.

It is preferable that the thickness of the thin metal film 21 is not less than 20 μm nor more than 200 μm, more preferable not less than 30 μm nor more than 50 μm. If the thickness of the thin metal film 21 is not smaller than 200 μm, the heat radiating characteristics deteriorate. If the thickness is not larger than 20 μm, strength required for the encapsulating medium cannot be obtained.

A preferred structure of the solid electrolyte battery (the gel electrolyte battery) encapsulated by using the encapsulating medium 2 will now be described. That is, ratio R of the volume (thickness×surface area) of the thin metal film 21 of the encapsulating medium 2 with respect to a capacity of 1 mAh of the battery is 0.0002 cm$^3$/mAh$\leq$R$\leq$0.05 cm$^3$/mAh. More preferably the ratio R is not less than 0.00035 cm$^3$/mAh nor more than 0.003 cm$^3$/mAh (when, for example, a 500 mAh-class solid electrolyte battery is encapsulated by an encapsulating medium (having a volume of 0.25 cm$^3$) incorporating the thin metal film which has a thickness of 50 μm and having a surface area of 50 cm$^2$, the value of ratio R is 0.0005 cm$^3$/mAh).

If the ratio R is not higher than 0.0002 cm$^3$/mAh, a satisfactory heat radiating effect cannot be obtained when the unit cell generates heat. If the ratio R is not lower than 0.05 cm$^3$/mAh, the capacity is too small or the volume of the encapsulating medium is too large from a viewpoint of practical use.

When the unit cell 1 is the solid electrolyte battery or the gel electrolyte battery, a polymer material employed as the solid polymer solid electrolyte may be any one of the following materials: silicon gel, acrylic gel, acrylonitrile gel, polyphosphagen denatured polymer, polyethylene oxide, polypropylene oxide, their composite polymer, crosslinked polymer, denatured polymer or fluorine polymer which are exemplified by poly (vinylidenefluoride), poly (vinylidenefluoride-co-hexafluoropolypropylene), poly (vinylidenefluoride-co-tetrafluoroethylene), poly (vinylidenefluoride-co-trifluoroethylene) and their mixture. As a matter of course, the material is not limited to the foregoing materials.

The solid electrolyte or the gel electrolyte laminated on the positive-electrode active material layer or the negative-electrode active material layer is obtained as follows. That is, the positive-electrode active material layer or the negative-electrode active material layer is impregnated with solution containing polymer compounds, salt of the electrolyte and solvent (in a case of the gel electrolyte, a plasticizer is furthermore contained). Then, the solvent is removed so as to be solidified. The positive-electrode active material layer or the negative-electrode active material layer is impregnated with a portion of the solid electrolyte or the gel electrolyte laminated on the positive-electrode active material layer or the negative-electrode active material layer. Thus, the portion of the solid electrolyte or the gel electrolyte is solidified. In a case of a crosslinked material, light or heat is used to cause crosslinking to occur so that the crosslinked material is solidified.

The gel electrolyte is composed of a plasticizer containing lithium salt and matrix polymers in a quantity not less than 2 wt % nor more than 30 wt %. The gel electrolyte may contain ester, ether or carbonate as an independent component or a portion of the plasticizer.

When the gel electrolyte is adjusted, matrix polymer for gelling the carbonate is used. The matrix polymer may be any one of a variety of polymers which have been employed to constitute the gel electrolyte. From a viewpoint of stability of oxidation and reduction, it is preferable that fluorine polymer, such as poly (vinylidenefluoride) or poly (vinylidenefluoride-co-hexafluoropolypropylene), is employed.

The solid polymer electrolyte is composed of lithium salt and a polymer compound which dissolves the lithium salt. The polymer compound is exemplified by ether polymer, such as poly (ethylene oxide) or its crosslinked material;

poly (methacrylate) ester; an acrylate material; or fluorine polymer, such as poly (vinylidenefluoride) or poly (vinylidenefluoride-co-hexafluoropolypropylene). The foregoing material may be employed solely or their mixture may be employed. From a viewpoint of stability of oxidation and reduction, it is preferable that the fluorine polymer, such as poly (vinylidenefluoride) or poly (vinylidenefluoride-co-hexafluoropolypropylene) is employed.

The lithium salt which must be contained in the gel electrolyte or the solid polymer electrolyte may be lithium salt which is contained in a usual electrolyte solution for a battery. The lithium compound (salt) may be any one of the following materials. As a matter of course, the lithium salt is not limited to the following materials.

The lithium salt is exemplified by lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, bis (trifluoromethanesulfonyl) imidolithium, $LiAsF_6$, $LiCF_3SO_3$, $LiC(SO_2CF_3)_3$, $LiAlCl_4$ or $LiSiF_6$.

The foregoing lithium compound may be employed solely or a plurality of the lithium compounds may be mixed. It is preferable that $LiPF_6$ or $LiBF_4$ is employed from a viewpoint of stability of oxidation and reduction.

The lithium salt is dissolved at a concentration of 0.1 mol to 3.0 mol in the plasticizer in a case of the gel electrolyte, preferably 0.5 mol/litter to 2.0 mol/litter.

The battery according to the present invention can be constituted by a method similar to a method for constituting a conventional lithium ion battery except for the structure of the present invention in which the foregoing gel electrolyte or the solid electrolyte is employed.

The material of the negative electrode of the lithium ion battery may be a material which is able to dope/dedope lithium. The foregoing material of the negative electrode may be a carbon material, such as non-graphitizing carbon or a graphite material. Specifically, any one of the following carbon materials may be employed: pyrocarbon; cokes (pitch cokes, needle cokes or petroleum cokes); graphite; vitreous carbon, a sintered compact of an organic polymer compound (a material obtained by sintering phenol resin or furan resin at a proper temperature so as to be carbonized); carbon fiber and active carbon. As an alternative to this, the material which is able to dope/dedope lithium may be a polymer material, such as polyacetylene or polypyrrole, or oxide, such as $SnO_2$. When the negative electrode is manufactured from any one of the foregoing material, a known binder and the like may be added.

The positive electrode may be manufactured by using metal oxide, metal sulfide or a specific polymer to correspond to the type of the required battery. When the lithium ion battery is manufactured, the active material of the positive electrode may be any one of the following materials: metal sulfide or oxide which does not contain lithium, for example, $TiS_2$, $NoS_2$, $NbSe_2$ or $V_2O_5$; or composite lithium oxide mainly composed of $LiMO_2$ (where M is one or types of transition metal and x which varies depending on the state of charge/discharge of the battery is usually not less than 0.05 nor more than 1.10). It is preferable that the transition metal M which constitutes the composite lithium oxide is Co, Ni, Mn or the like. The composite lithium oxide is exemplified by $LiCoO_2$, $LiNiO_2$, $LiNi_yCo_{1-y}O_2$ (where $0<y<1$) and $LiMn_2O_4$. The foregoing composite lithium oxide is an active material for the positive electrode which is capable of generating high voltage and which exhibits a satisfactory energy density. Plural type of the foregoing active materials may be contained in the positive electrode.

When the active material is employed to manufacture the positive electrode, a known conductive material and a binder may be added.

To efficiently disperse heat generated in the unit cell 1, it is preferable that the collector of the negative electrode and that of the positive electrode of the unit cell 1 are made of a metal material having the heat conductivity k of 230 $Wm^{-1}K^{-1}$ or higher. If the heat conductivity k is lower than the above-mentioned value, there is a possibility that heat is accumulated in the battery, in particular in the central portion of the battery. The foregoing metal material is exemplified by aluminum which is the material for the collector of the positive electrode and copper which is the material for the collector of the negative electrode.

It is preferable that the thin metal film of the collector is not less than 10 $\mu$m nor more than 100 $\mu$m more preferably not less than 20 $\mu$m nor more than 50 $\mu$m. If the thickness of the collector is not smaller than the foregoing value, the heat radiating characteristic undesirably deteriorates. If the thickness is not larger than the foregoing value, there arise problems of unsatisfactory adhesiveness with the active material and strength required for the collector.

Figure 4:
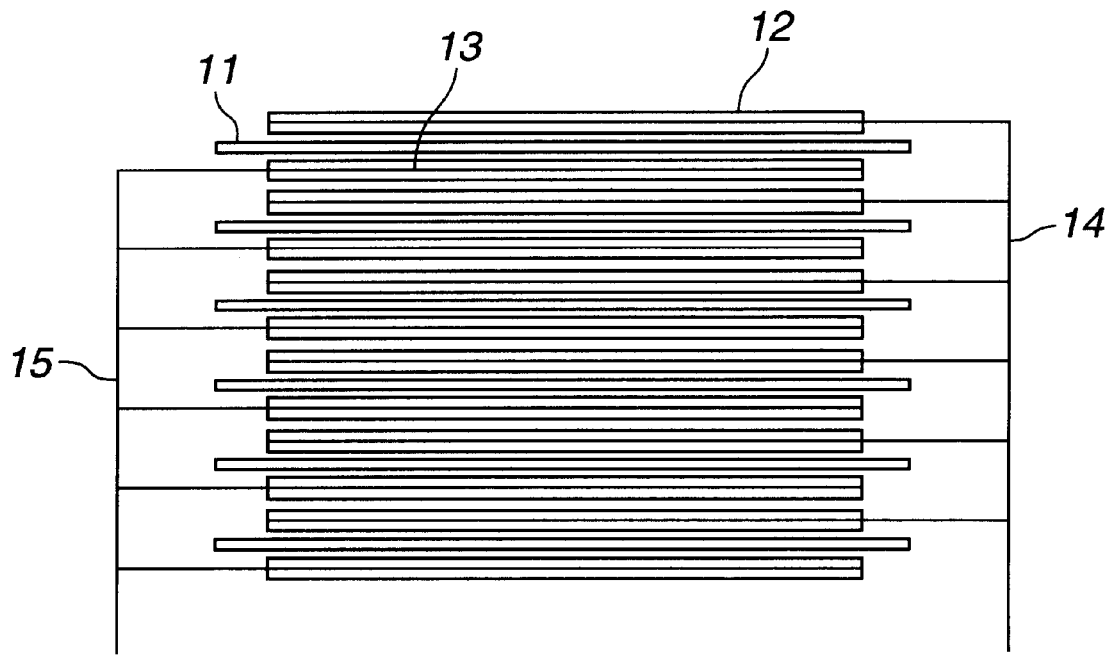
FIG. 4 is a schematic view showing the structure of a laminate type unit cell.
Figure 5:
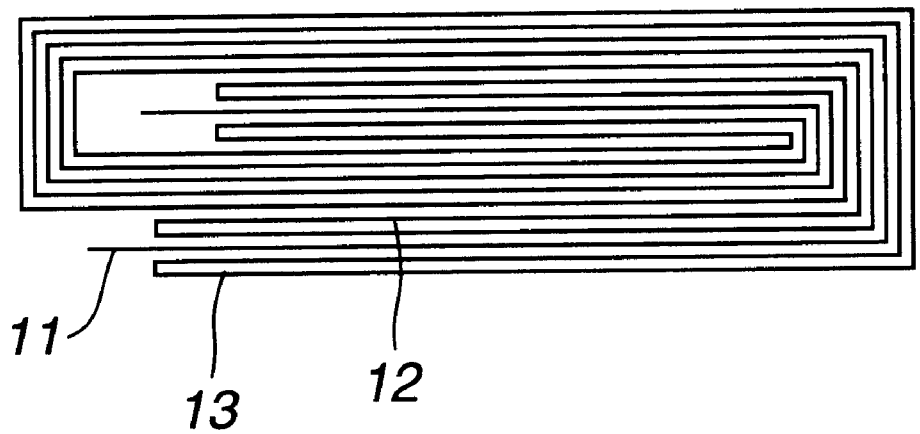
FIG. 5 is a schematic view showing a structure of winding-type unit cell.
Figure 6:
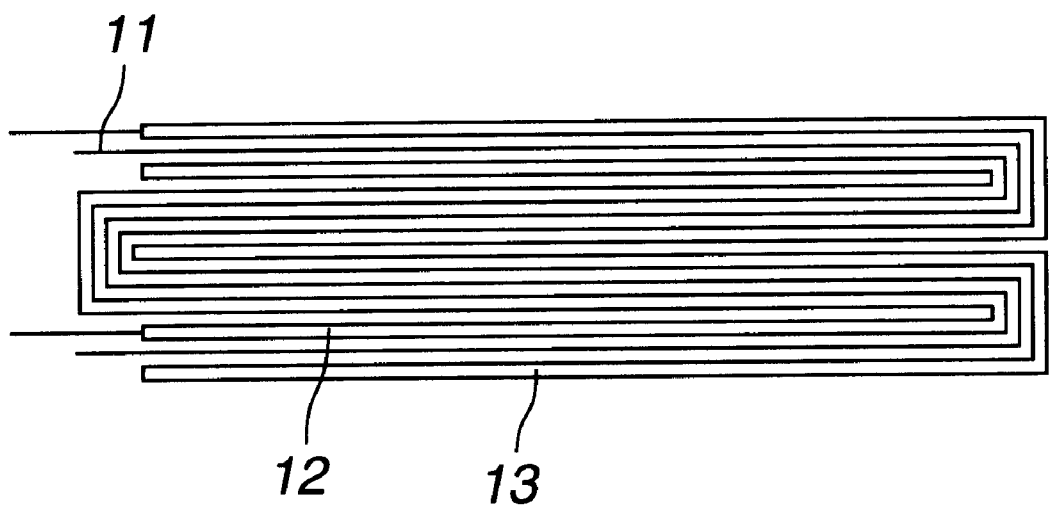
FIG. 6 is a schematic view showing the structure of a folding-type unit cell.

The structure of the unit cell 1 will now be described. A laminated structure is formed as shown in FIG. 4 such that positive electrodes 12 and negative electrodes 13 are alternately laminated across solid electrolytes 11. Then, positive electrode leads 14 and negative electrode leads 15 are drawn out from the two sides. A winding-type structure is formed as shown in FIG. 5 such that a positive electrode 12 and a negative electrode 13 are laminated across solid electrolytes 11. Then, the layers are wound. A folding-type structure is formed as shown in FIG. 6 such that positive electrodes 12 and negative electrodes 13 are laminated across solid electrolytes 11. Then, the layers are alternately folded. Any one of the foregoing structures may be selected. From a viewpoint of efficiently dispersing heat in the battery, it is preferable that the winding-type structure is employed.

EXAMPLES

Examples and comparative examples of the present invention will now be described on the basis of results of experiments.

Unit cells employed to perform evaluations had a sandwich structure in which the positive electrode was made of cobaltous lithium, the negative electrode was made of graphite, the collector of the positive electrode was made of aluminum foil, the collector of the negative electrode was copper foil and the solid electrolyte was constituted by enclosing polyvinylidene fluoride (PVDF). The size of the unit cell was 5 cm×4 cm×0.4 cm and the capacity was 450 mAh.

Initially, the encapsulating medium which was three-layer structure nylon (100 $\mu$m/metal foil/polyethylene (80 $\mu$m) was employed. A variety of encapsulating mediums were employed in such a manner that the physical properties of the metal portion satisfied values shown in Table 1 so that samples A to F were manufactured.

TABLE 1

| Samples | Metal Materials | Heat Conductivity k $(Wm^{-1}K^{-1})$ | Thicknesses of Metal Portions ($\mu$m) |
| --- | --- | --- | --- |
| A | Aluminum | 236 | 45 |
| B | Aluminum | 236 | 200 |
| C | Aluminum | 236 | 45 |

TABLE 1-continued

| Samples | | | |
|---|---|---|---|
| D | Nickel | 94 | 45 |
| E | Iron | 83.5 | 45 |
| F | Copper | 403 | 45 |
| G | Aluminum | 236 | 15 |

| Samples | Surface Areas of Encapsulating Mediums (cm²) | Volumes of Metal Portions (cm³) | Volume/Capacity |
|---|---|---|---|
| A | 5.0 | 0.225 | 0.0005 |
| B | 5.0 | 1.00 | 0.0022 |
| C | 200 | 0.90 | 0.002 |
| D | 50 | 0.225 | 0.0005 |
| E | 50 | 0.225 | 0.0005 |
| F | 50 | 0.225 | 0.0005 |
| G | 50 | 0.075 | 0.00016 |

The sample batteries were excessively charged to 1C and 4.30V to cause each battery to externally short-circuit. The temperatures of the surface of each battery and that of the central portion of the unit cell were examined. Results were shown in Table 2.

TABLE 2

| samples | surface of the battery | central portion of the unit cell |
|---|---|---|
| | immediately after short circuit | |
| A | 65 | 140 |
| B | 54 | 138 |
| C | 61 | 135 |
| D | 42 | 140 |
| E | 39 | 138 |
| F | 71 | 140 |
| G | 78 | 137 |
| | 10 s after short circuit | |
| A | 165 | 198 |
| B | 177 | 189 |
| C | 100 | 119 |
| D | 179 | 180 |
| E | 161 | 175 |
| F | 165 | 148 |
| G | 147 | 139 |
| | 20 s after short circuit | |
| A | 133 | 140 |
| B | 177 | 166 |
| C | 113 | 146 |
| D | 191 | 220 |
| E | 199 | 228 |
| F | 122 | 105 |
| G | 160 | 160 |

In general, the temperature of heat generated in the battery when the external short circuit occurs is about 200° C. The temperature of heat generated by the sample batteries composed of the material exhibiting an excellent heat radiation effect was limited to 200° C. or lower. Therefore, an excellent heat radiating effect of the present invention was confirmed.

Then, an encapsulating medium similar to that of sample A was employed. Moreover, a variety of metal materials were employed to form the collectors of the unit cells which must be encapsulated. Thus, unit cells were manufactured which were excessively charged at 1C and 4.30V so that each battery was externally short-circuited. Then, the states of temperatures at the surface of each battery and the central portion of each unit cell were examined. Results were shown in Table 3.

TABLE 3

| samples | metal material of collector/thickness (μm) | | 10 s after short circuit | | 20 s after short circuit | |
|---|---|---|---|---|---|---|
| | positive electrode portion | negative electrode portion | surface of the battery | central portion of the unit cell | surface of the battery | central portion of the unit cell |
| a | Al/50 | Cu/50 | 165 | 198 | 133 | 140 |
| b | Al/35 | Cu/20 | 150 | 192 | 165 | 188 |
| c | Al/50 | Ni/50 | 132 | 210 | 166 | 223 |
| d | stainless steel/50 | Cu/50 | 143 | 190 | 191 | 228 |
| e | stainless steel/40 | Ni/40 | 128 | 205 | 169 | 237 |

Note that the heat conductivity of stainless steel (Cr 17.9, Ni 8.0 and Mn 0.3) shown in Table 3 was 16.5 $Wm^{-1}K^{-1}$.

As can be understood from Table 3, generation of heat can effectively be prevented when the metal material having a high heat conductivity is employed to form the collector.

As described above, according to the present invention, heat generated when short circuit has occurred between the positive electrode and the negative electrode can quickly be dispersed. As a result, accumulation of latent heat in the battery can be prevented.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous-electrolyte battery comprising:
an encapsulating medium constituted by a laminated film in which a unit cell is accommodated, wherein
said laminated film of said encapsulating medium contains a metal material having a heat conductivity k at room temperatures which is 230 $Wm^{-1}K^{-1}$ or higher and having a thickness that ranges from about 30 micrometers to about 50 micrometers.

2. A nonaqueous-electrolyte battery according to claim 1, wherein ratio R of the volume of the metal material portion of the encapsulating medium with respect to a capacity of 1 mAh of the unit cell is 0.0002 cm³/mAh≦R≦0.05 cm³/mAh.

3. A nonaqueous-electrolyte battery according to claim 1, wherein a collector of a positive electrode and/or a negative electrode constituting said unit cell is made of a metal material having a heat conductivity k at room temperatures which is 230 $Wm^{-1}K^{-1}$ or higher.

4. A nonaqueous-electrolyte battery according to claim 1, wherein an electrolyte constituting said unit cell is a gel electrolyte or a solid electrolyte containing matrix polymer and lithium salt.

5. A nonaqueous-electrolyte battery according to claim 1, wherein said negative electrode constituting said unit cell is a negative electrode containing a material which is able to dope/dedope lithium.

6. A nonaqueous-electrolyte battery according to claim 5, wherein said material which is able to dope/dedope lithium is a carbon material.

7. A nonaqueous-electrolyte battery according to claim 1, wherein said positive electrode constituting said unit cell is a positive electrode containing composite oxide of lithium and transition metal.

8. A nonaqueous-electrolyte battery comprising:

a unit cell and an encapsulating medium that encapsulates the unit cell;

the unit cell comprising a positive electrode and a negative electrode each laminated onto a solid electrolyte wherein the unit cell forms a winding structure;

the encapsulating medium comprising a laminated film which includes a metal material having a heat conductivity k at room temperature ranging from 230 $Wm^{-1}K^{-1}$ or higher and having a thickness that ranges from about 30 micrometers to about 50 micrometers.

9. The nonaqueous-electrolyte battery of claim 8 wherein the positive electrode, the negative electrode or both have a collector to disperse heat that is generated in the unit cell.

10. The nonaqueous-electrolyte battery of claim 9 wherein the collector is a metal material.

11. The nonaqueous-electrolyte battery of claim 10 wherein the metal material is selected from the group consisting of aluminum, copper, nickel, stainless steel or combinations thereof.

12. The nonaqueous-electrolyte battery of claim 10 wherein the metal material has a heat conductivity k at room temperature ranging from 230 $Wm^{-1}K^{-1}$ or higher.

13. The nonaqueous-electrolyte battery of claim 10 wherein the metal material has a thickness ranging from 10 micrometers to 100 micrometers.

14. The nonaqueous-electrolyte battery of claim 9 wherein the collector of the positive electrode comprises a thin metal film composed of aluminum.

15. The nonaqueous-electrolyte battery of claim 9 wherein the collector of the negative electrode comprises a thin film metal composed of copper.

* * * * *